UNITED STATES PATENT OFFICE.

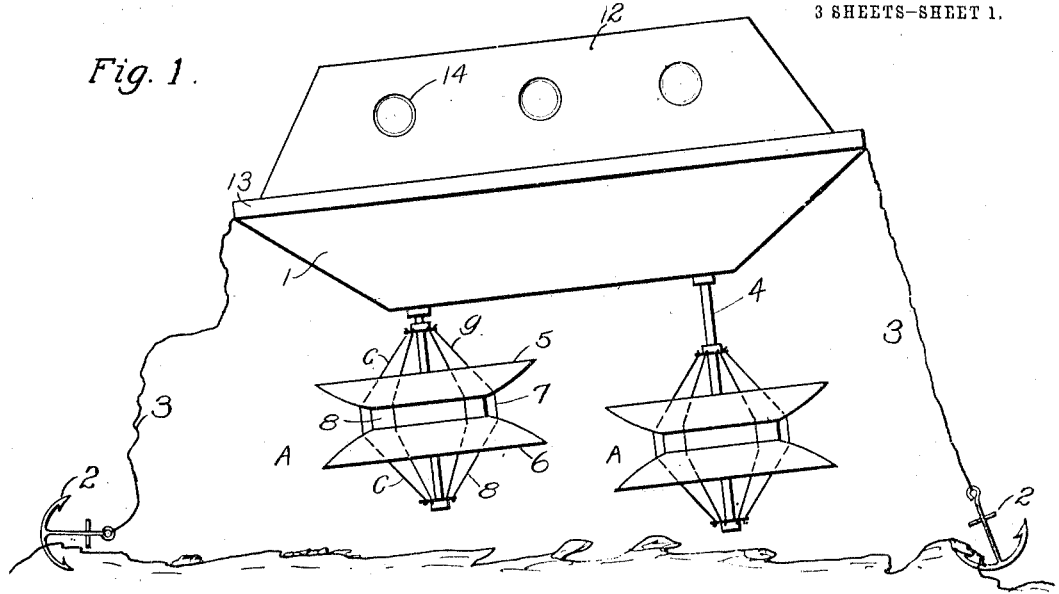
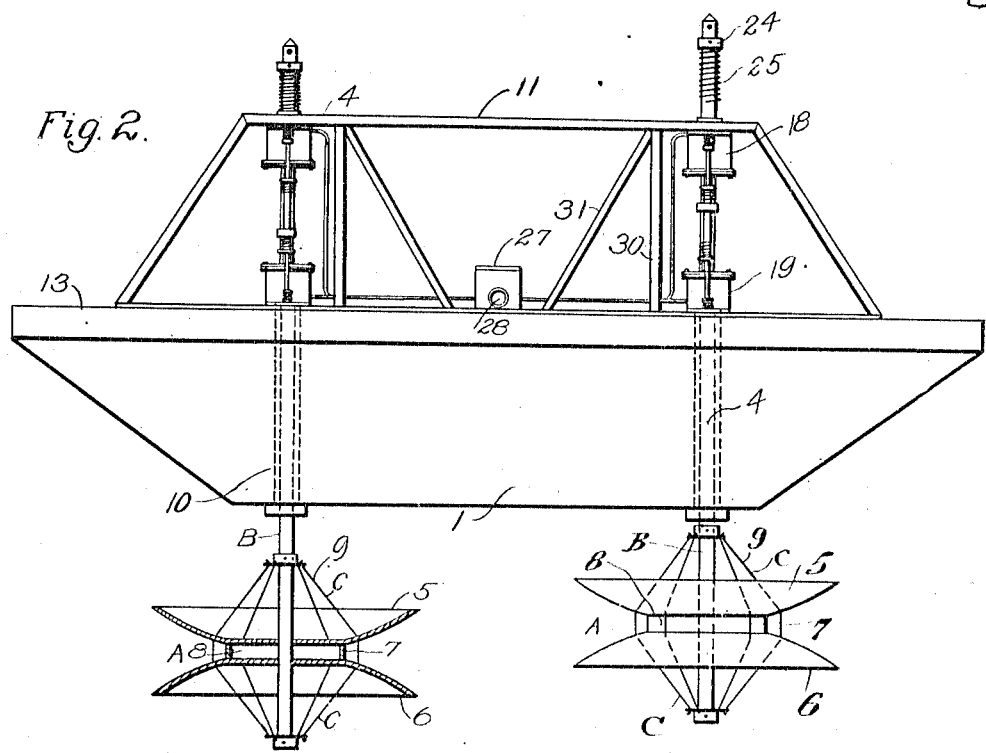

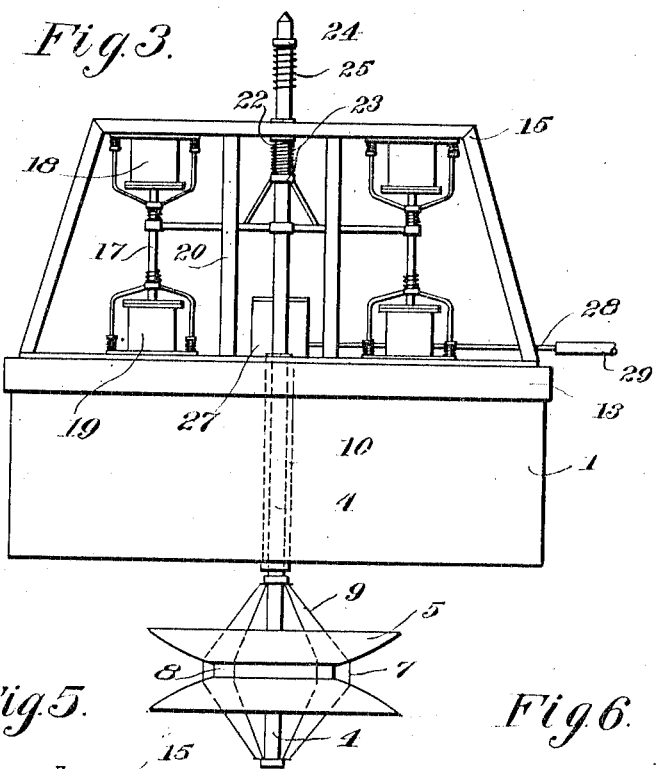
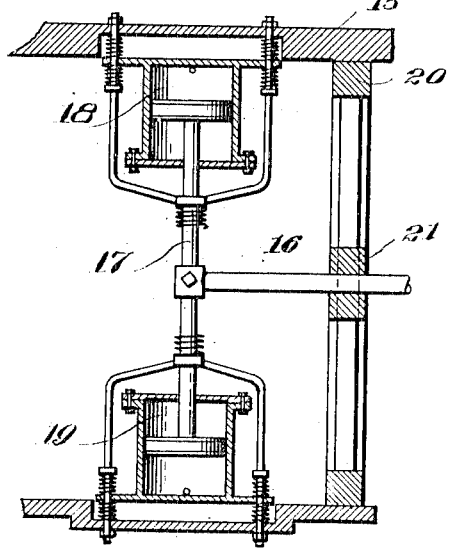
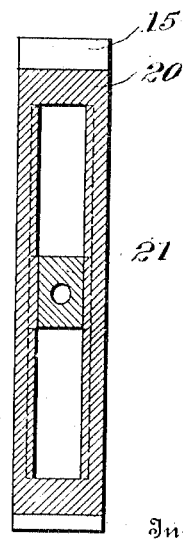

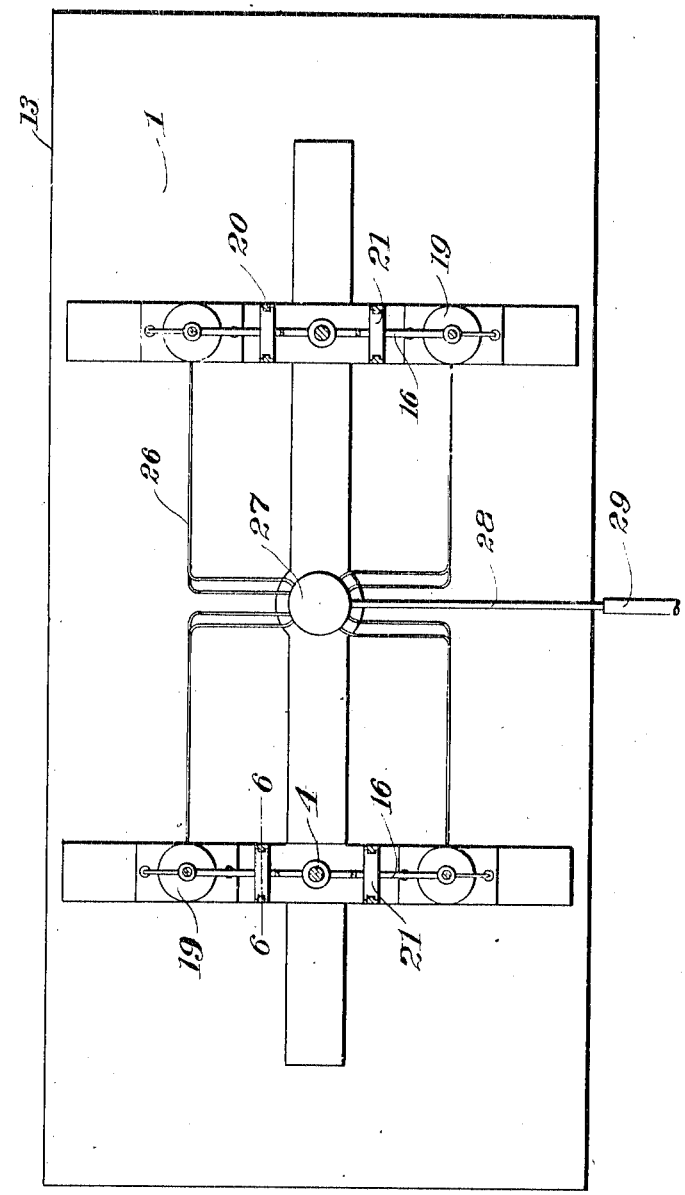

ERIK ANDERSON, OF SAN FRANCISCO, CALIFORNIA.

WAVE-MOTOR.

1,102,121.  Specification of Letters Patent.  Patented June 30, 1914.

Application filed September 3, 1913. Serial No. 787,922.

*To all whom it may concern:*

Be it known that I, ERIK ANDERSON, a citizen of the United States, residing at San Francisco, in the county of San Francisco and State of California, have invented new and useful Improvements in Wave-Motors, of which the following is a specification.

This invention relates to wave motors, the object in view being to produce a motor of the class described embodying a buoyant member or float upon which the power generating mechanism is supported, the said buoyant member being designed to be anchored in a position where it is subjected to a rising and falling movement produced by the waves, the power generating mechanism carried by the buoyant member embodying a novel arrangement and construction of pistons which act to compress air, the air being conducted into a suitable tank or reservoir from which it may be delivered through a pipe or conduit to the shore or other point where it is utilized as a motive agent.

With the above and other objects in view, the invention consists in the construction, combination and arrangement of parts, as will hereinafter be more fully described, illustrated and claimed.

In the accompanying drawing:—Figure 1 is a side elevation of a wave motor embodying the present invention showing the same suitably anchored. Fig. 2 is a side elevation of the wave motor on an enlarged scale with the hood removed. Fig. 3 is an end elevation of the same. Fig. 4 is a plan view thereof. Fig. 5 is a vertical diametrical section taken in line with one of the piston shafts. Fig. 6 is a detail vertical section on the line 6—6 of Fig. 4.

The wave motor contemplated in this invention comprises a floating member 1 which is shown in the form of a barge or lighter of suitable size to support the air compressing mechanism hereinafter particularly described, the said buoyant member or float 1 being designed to be anchored adjacent to the shore, the anchoring means being shown conveniently as consisting of a plurality of anchors 2 connected by chains 3 to the member 1. It will be noted that the member 1 is preferably anchored so that its length is arranged transversely to the incoming waves, whereby a longitudinal oscillatory movement is imparted by the waves to the member 1.

Arranged at the front and rear of the buoyant member are vertically extending shafts 4 each of which carries a duplex piston designated generally by the letter A. Each piston comprises a pair of concavo-convex piston heads 5 and 6 disposed reversely to each other or arranged with their convex sides toward each other as clearly shown in the drawings, the convex faces of the piston heads being connected by an annular wall or rim 7 forming an air-tight buoyant chamber 8 of sufficient size to compensate for the weight of the duplex piston thereby enabling said piston to operate easily. The shaft 4 extends a suitable distance below the bottom piston head 6 and has radiating therefrom a series of stays 8 which are connected at their outer and upper extremities to the lower piston head 6, a corresponding series of stays 9 connecting the upper piston head 5 with the shaft 4, as shown, the two heads of the piston thus being firmly braced relatively to the shaft 4.

Each shaft 4 is slidable longitudinally in a vertical direction through a tube 10 extending from the bottom to the top of the member 1 said tube being water-tight to prevent leakage of water to the interior of the member 1. The shaft 4 also extends considerably above the deck of the member 1 where it passes through a combined guide and longitudinal truss 11 which also forms one of the supports for a hood 12 shown in Fig. 1, the said hood resting at its bottom edge upon the deck 13 and being provided with any suitable number of ports or windows 14. In addition to the longitudinal truss 11, transverse trusses 15 are provided adjacent to the front and rear ends of the longitudinal truss 11, said lateral trusses also forming additional supports for the hood 12, the latter forming a protective covering for the air compressing mechanism to be described.

Each shaft 4 carries a crosshead 16 which is connected at its opposite ends to a pair of piston rods 17 the pistons of which work in upper and lower air compressing cylinders 18 and 19 respectively, the cylinders 18 and 19 being arranged in vertical alinement with each other and there being two sets of pistons and cylinders for each shaft 4 although it will be understood that when desired any number of pistons and cylinders may be associated with one shaft 4 in accordance with the desire of the manufacturer and the particular use to which the motor as a whole is put.

Arranged at opposite sides of each shaft 4 and between the sets of cylinders 18 and 19 are parallel vertical guides 20 in each of which is arranged a vertically sliding bearing or runner 21 through which the crosshead 16 passes. In this way the crosshead is braced and guided in its up and down movements thus removing any lateral or twisting strain from the piston rods 17.

The shaft 4 is provided below the truss 11 with a cushioning spring 22 which is confined between said truss and a fixed shoulder or collar 23 on the shaft 4. Adjacent to its upper end the shaft 4 is provided with another collar or shoulder 24 beneath which is a coiled cushioning spring 25 adapted to come in contact with the top of the truss 11 when the shaft 4 approaches the lower limit of its movement. The springs 22 and 25 thus cushion the extreme movements of the shaft 4 and avoid any sudden impact between the shaft 4 and the truss 11, thereby adding to the smoothness of operation and durability of the mechanism involved.

Extending from each of the air compressing cylinders 18 and 19 is a pipe or tube 26 leading into a common tank or reservoir 27 so that the air compressed in all of the cylinders is transferred to the common tank or reservoir 27. Extending outwardly from the tank 27 is a delivery nozzle 28 to which a flexible pipe or hose 29 may be attached to convey the compressed air to the shore or point of use.

When the wave motor is anchored as shown in Fig. 1 so as to be subjected to a fore and aft rocking movement by the waves, the duplex pistons will have a reciprocatory movement imparted thereto by reason of their being submerged in a solid body of water, this effect being materially enhanced by reason of the particular arrangement of the piston heads 5 and 6. On account of the concave sides of the pistons being arranged away from each other, there will be a considerable tendency for said pistons to resist being drawn upward or pushed downward by the rising and falling member 1 and consequently a reciprocatory movement will be imparted to each of the shafts 4. In the downward movement of one of the duplex pistons, the water will be trapped in the concave side of the lower piston head and will slide easily off the convex side of the upper piston head while in the upward movement of the duplex piston, the water will be trapped in the concave side of the upper piston head and will slide freely off the convex side of the lower piston head. This provides the necessary resistance to the movement of the duplex piston to effect the reciprocation of the shaft 4 which as previously noted produces the reciprocatory movement of the piston rods 17 and the air compressing pistons in the cylinders 18 and 19.

The motor as a whole, after being anchored requires no attention on the part of the operator except the periodical lubrication of the working parts of the mechanism.

30 designates additional supporting posts for the longitudinal truss 11, and 31 inclined braces extending from the truss 11 and upper ends of the posts 30 downwardly to the deck 13 to which they are fastened.

What I claim is:—

1. In a wave motor, a portable buoyant member adapted to be anchored in a body of water, an air compressor carried by said buoyant member, a normally vertical reciprocatory shaft for operating said air compressor, and a submerged duplex piston on said shaft, said piston comprising reversely disposed piston heads concavo-convex in cross section and having their convex surfaces facing each other.

2. In a wave motor, a portable buoyant member adapted to be anchored in a body of water, an air compressor carried by said buoyant member, a normally vertical reciprocatory shaft for operating said compressor, a submerged piston on said shaft embodying reversely disposed concavo-convex piston heads having their convex sides facing each other, and an air-tight compartment interposed between the piston heads.

3. In a wave motor, a portable buoyant member adapted to be anchored in a body of water, an air compressor mounted thereon and embodying an air cylinder and piston and a normally vertical reciprocatory piston shaft, a submerged piston operated by the resistance of the water in which said piston is submerged for imparting movement to the air compressor, and means for yieldingly supporting and cushioning said cylinder.

In testimony whereof I affix my signature in presence of two witnesses.

ERIK ANDERSON.

Witnesses:
JOHN E. SMITH,
HENRY O. CARLSON.